（12）United States Patent
McCoy, Jr.

(10) Patent No.: US 8,900,106 B2
(45) Date of Patent: Dec. 2, 2014

(54) SUBSEA TOOL CHANGER

(75) Inventor: Richard W. McCoy, Jr., Cypress, TX (US)

(73) Assignee: Oceaneering International, Inc., Houston, TX (US)

( * ) Notice: Subject to any disclaimer, the term of this patent is extended or adjusted under 35 U.S.C. 154(b) by 1269 days.

(21) Appl. No.: 12/403,038

(22) Filed: Mar. 12, 2009

(65) Prior Publication Data

US 2009/0233774 A1  Sep. 17, 2009

Related U.S. Application Data

(60) Provisional application No. 61/035,957, filed on Mar. 12, 2008.

(51) Int. Cl.
*B23Q 3/155* (2006.01)
*B23Q 3/157* (2006.01)
*B23Q 11/08* (2006.01)
*E21B 19/14* (2006.01)
*B63C 11/52* (2006.01)
*E21B 41/04* (2006.01)

(52) U.S. Cl.
CPC ............... *B23Q 3/155* (2013.01); *B23Q 11/08* (2013.01); *E21B 19/143* (2013.01); *B23Q 3/15506* (2013.01); *E21B 19/146* (2013.01); *B63C 11/52* (2013.01); *E21B 41/04* (2013.01)
USPC ................................... 483/3; 483/16; 483/56

(58) Field of Classification Search
CPC ........... B23Q 3/15506; B23Q 3/15566; B23Q 3/15706
USPC ............. 483/60, 61, 62, 57, 56, 54–55, 16, 3; 175/52, 85
See application file for complete search history.

(56) References Cited

U.S. PATENT DOCUMENTS

| | | | | |
|---|---|---|---|---|
| RE25,583 E | * | 5/1964 | Brainard et al. | 483/3 |
| 3,691,626 A | * | 9/1972 | Mousseau et al. | 483/62 |
| 4,897,014 A | * | 1/1990 | Tietze | 483/901 |
| 5,281,079 A | * | 1/1994 | Lemelson | 29/26 A |
| 5,300,006 A | * | 4/1994 | Tanaka et al. | 483/56 |
| 5,346,453 A | * | 9/1994 | Rivera-Bottzeck | 483/51 |
| 6,077,206 A | * | 6/2000 | Azema | 483/3 |
| 2002/0115541 A1 | | 8/2002 | Patel et al. | |
| 2002/0134552 A1 | | 9/2002 | Moss | |

\* cited by examiner

*Primary Examiner* — Erica E Cadugan
(74) *Attorney, Agent, or Firm* — Gary R. Maze; Berenbaum Weinshienk, PC

(57) ABSTRACT

A subsea tool changer comprises a housing; a rotatable carousel rotatably mounted within the housing and adapted to receive a plurality of selectively removable tools; a tool changer that can select a predetermined one of the plurality of tools from the carousel; and a power drive adapted to provide a predetermined function to a tool selected by the tool changer, the power drive further comprising a first power drive interface. In typical use, a selectively removable tool is placed onto the rotatable carousel which is rotated so that a desired selectively removable tool is positioned adjacent to a tool driver which is then mated with the desired selectively removable tool. The tool changer and mated selected removable tool are moved outward toward an outer boundary of the housing and the tool changer extended at least partially outside the housing outward towards a predetermined tool working position. The tool changer is then pivoted to position the selected removable tool to its predetermined tool working position.

14 Claims, 5 Drawing Sheets

SUBSEA TOOL CHANGER

RELATION TO PRIOR APPLICATIONS

This application claims the benefit of U.S. Provisional Application 61/035,957 entitled "ROV Subsea Tool Changer" filed Mar. 12, 2008.

FIELD OF THE INVENTION

The disclosed tool changer allows deployment of multiple, selectable tools. More particularly, the disclosed tool changer allows deployment of multiple, selectable tools in a common housing where one or more of the multiple, selectable tools are selectable underwater such as by using a remotely operated vehicle (ROV) or autonomous underwater vehicle (AUV).

BACKGROUND OF THE INVENTION

ROVs and, at times, AUVs require tools when operating underwater, such as to work on pipelines, wellheads, and other structures while underwater. Most often, these tools are taken down or otherwise supplied one at a time, interactively, by returning the ROV or AUV to a surface location to allow manual exchange of the tools.

However, in certain situations, once on site at a remote location (potentially under ice), an ROV or AUV may have to stay deployed underwater for a long time, e.g. up to six months or more, and operate without any maintenance or direct operator intervention. This means that there is no one to manually change out ROV tools as is the normal oilfield practice.

SUMMARY

The disclosed subsea tool changer allows multiple tools such as those usable by an ROV to be carried subsea to support multitasking during ROV dives (missions). The tools share a common power/drive interface that allows different tools to be selected, acquired, positioned, operated, and stowed without having to make and break electrical or hydraulic connections.

DETAILED DESCRIPTION OF PREFERRED EMBODIMENTS

Figure 1:
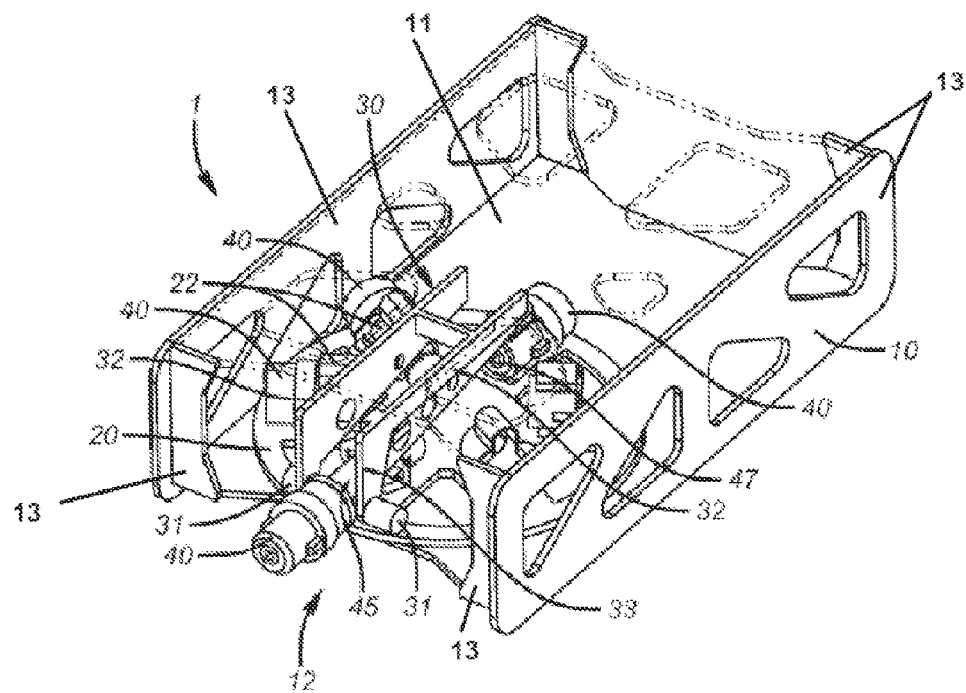
FIG. 1 is a view in partial cutaway perspective of an exemplary embodiment of the subsea tool changer.

Referring now to FIG. 1, subsea tool changer 1 comprises housing 10; carousel 20 rotatably mounted within housing 10 and adapted to receive a plurality of selectively removable tools 40; tool changer 30 adapted to select a predetermined one of the plurality of tools 40 from carousel 20; and power drive 45 adapted to provide a predetermined function to tool 40 that has been selected by tool changer 30, power drive 45 further comprising first power drive interface 46.

As will be understood by those of ordinary skill in these arts, tool 40 may be a plurality of tools 40 with one or more of the tools 40 being selectively removable.

Housing 10 is typically constructed of a material such as aluminum, glass reinforced plastic (GRP), or a plastic such as High Density Polyethylene (HDPE) or Ultra High Molecular Weight (UHMW) plastic. As illustrated in FIG. 1, housing 10 may be substantially rectangular and have at least one substantially open end, e.g. end 12, which allows for tool 40 to engage with a further device or otherwise be deployed outside housing 10. Housing 10 may be fully or partially enclosed. The housing 10 illustrated in the figures includes a housing bottom 11 having a housing outer boundary 14, a plurality of side walls 13 attached to the bottom 11 at the outer boundary 14, and a housing top 15.

Carousel 20 is typically constructed of a material such as aluminum, GRP, or a plastic such as HDPE or UHMW plastic In preferred embodiments, carousel 20 further comprises one or more tool retainers 22 which are dimensioned and configured to selectively retain the selectively removable tools 40. Using tool retainer 22 allows insertion and retraction of tool 40 into and/or out from tool retainer 22. It is noted that each tool retainer 22 includes a radially inner first end 23 and a radially outer second end 24.

Tool changer 30 is adapted to select a desired tool 40 from a storage place within housing 10. In a preferred embodiment, tools 40 are stored in tool retainers 22. In a preferred embodiment, tool changer 30 comprises selectively extendable arm 32.

Figure 2:
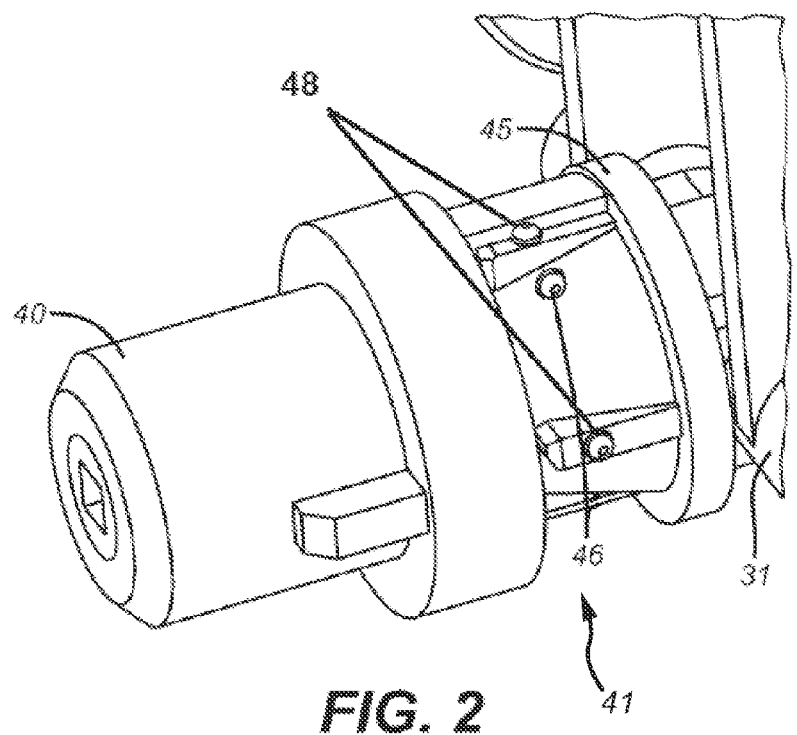
FIG. 2 is a view in partial cutaway perspective of a closeup of an exemplary embodiment a power drive illustrating exemplary latches in an extended position.

Power drive 45 provides selection, acquisition, positioning, operating, or stowing functions, or the like, or a combination thereof. Power drive 45 is typically pivotably attached to tool changer 30 such as at pivot 31. First power drive interface 46 (FIG. 2), located at a tool mating end 41 of the power drive 45, is typically pivotably attached to selectively extendable arm 32 proximate end 33 which is disposed proximate an outer boundary of carousel 30.

Each tool 40 may further comprise a common second power drive interface 47 which is dimensioned and configured to selectively and operatively mate with first power drive interface 46. Tools 40 will typically require electrical, hydraulic, or similar power, or a combination thereof. In a preferred embodiment, first power drive interface 46 operatively couples to second power drive interface 47 without having to make and break an electrical or hydraulic connection.

Figure 3:
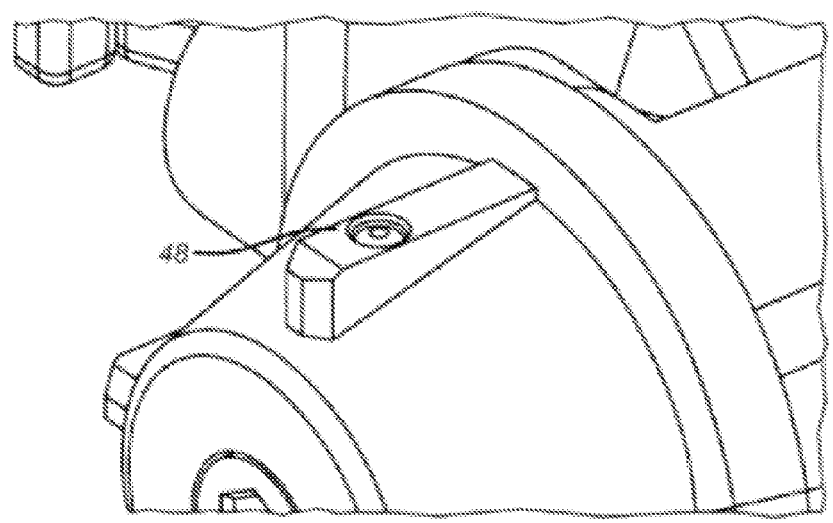
FIG. 3 is a view in partial cutaway perspective of a closeup of an exemplary embodiment a power drive illustrating exemplary latches in a retracted position.

In preferred embodiments, one or more latches 48 (FIG. 2) are dimensioned and configured to secure a selected removable tool 40 to power drive 45 such as at first power interface 46. In preferred embodiments, latch 48 is selectively extendable and retractable (FIG. 3).

In alternative embodiments, referring still to FIG. 1, subsea tool changer 1 may comprise one or more onboard power sources 50 (FIG. 5a), one or more external power interfaces 52 (FIG. 5a), or a combination thereof. Power sources 50 are operatively in communication with power drive 45. External power interface 52 may be dimensioned and configured to interface with a power source 54, schematically shown in FIG. 5a, from a remotely operated vehicle, an autonomously operated vehicle, or the like, or a combination thereof. In typical embodiments, external power interface 52 comprises electrical and/or hydraulic power interfaces or the like, or a combination thereof. The onboard power source(s) 50 and external power interface 52 interface with the power drive 45 at a power source interface 44, schematically shown in FIG. 5a.

In the operation of exemplary embodiments, for subsea tool changer 1 as described above, a selectively removable tool 40 is positioned and secured onto carousel 30 which is rotatably disposed within housing 10.

Figure 4:
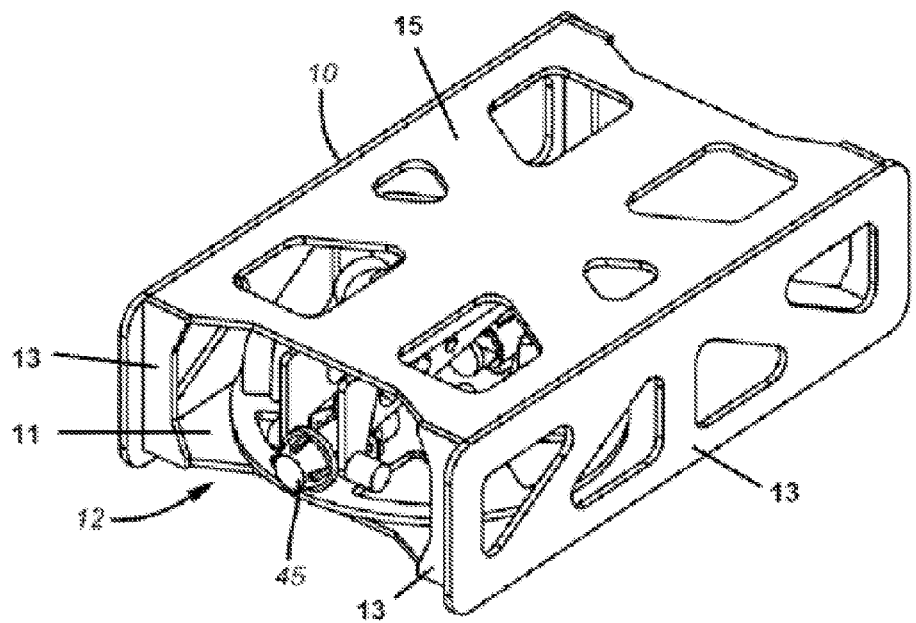
FIGS. 4-8 are views in partial cutaway perspective of an exemplary embodiment of the subsea tool changer illustrating a sequence of selecting a tool, with FIG. 5a showing a schematic representation of power components.
Figure 5:
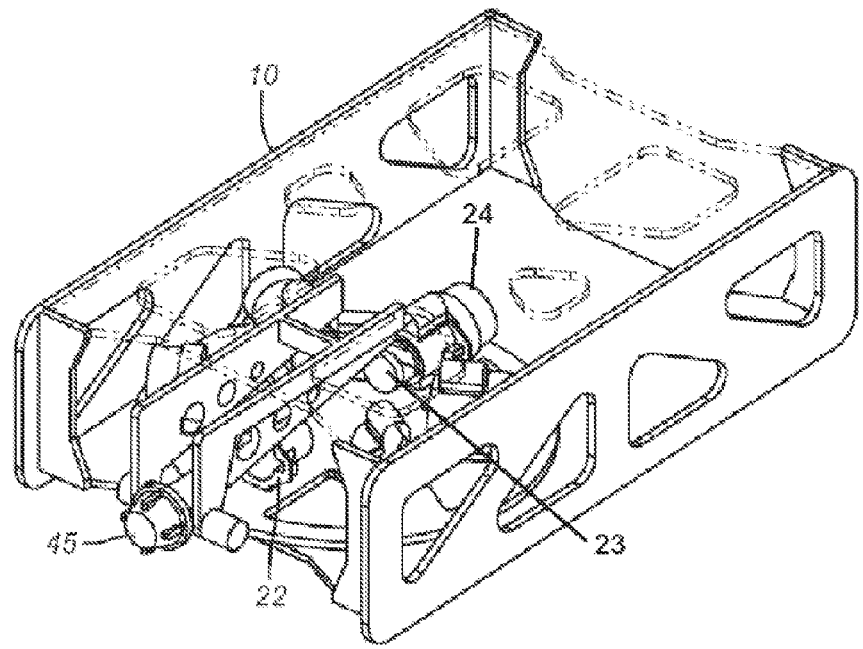
Figure 5A:
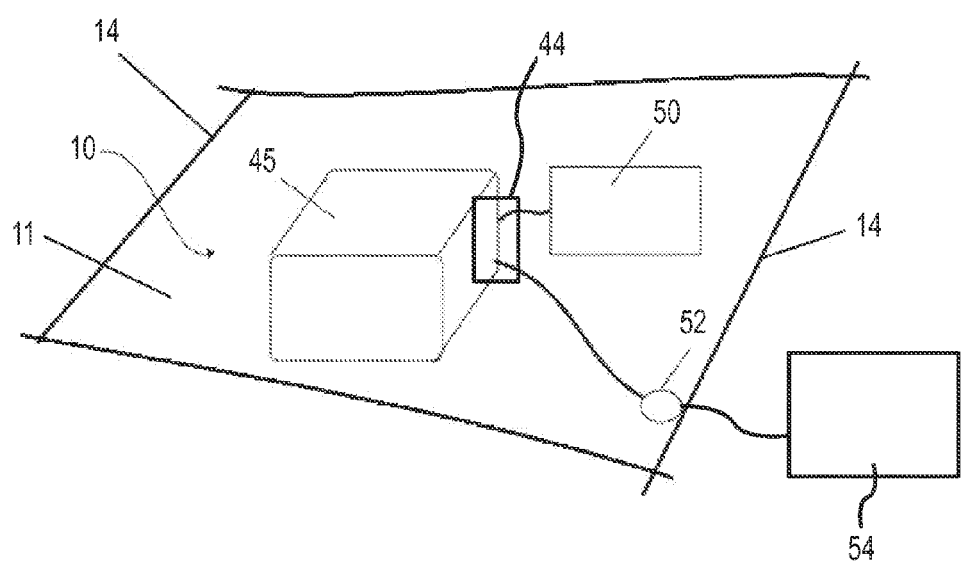
Figure 6:
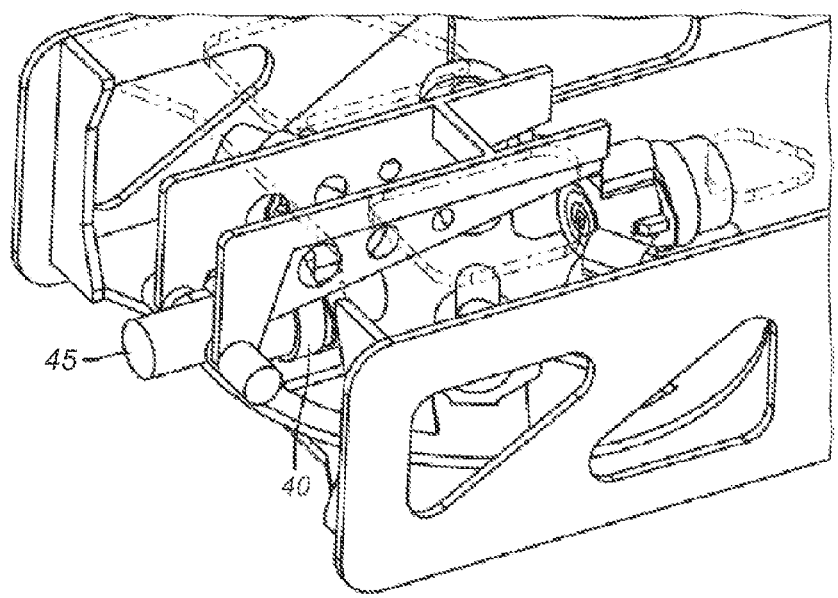
Figure 7:
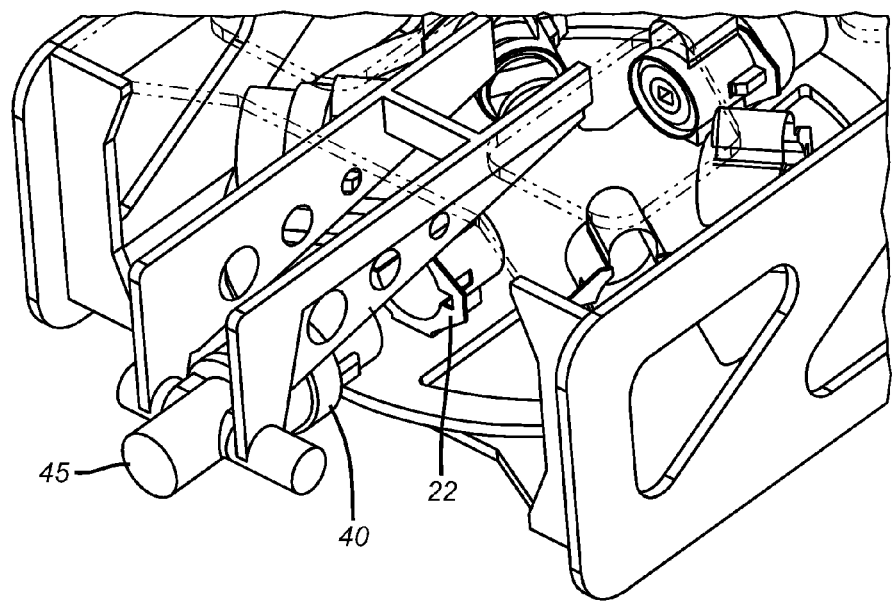

Referring generally to FIGS. 4-8, tool changer 30 typically starts in the stowed position (FIG. 1). Tool changer 30 is then extended outward toward the front of housing 10 (FIGS. 4-5). Carousel 20 is rotated so that the desired tool 40 is at a first position adjacent to tool changer 30 and then the desired tool 40 to be selected is selected by tool changer 30 (FIG. 6).

In a preferred embodiment, tool changer 30 is retracted at least partially into housing 10 to allow it to engage the selected removable tool 40 with first power drive interface 46. For example, power drive 45 is positioned into a position to where its first power drive interface 46 is facing tool 40 to be acquired, e.g. pivoted backwards. Tool changer 30 is retracted inward toward carousel 20 and the tool 40 to be acquired such that first power drive interface 46 is mated to tool 40, e.g. into second power drive interface 47. In a typical method, the mating is via a rotary mechanical connection and tool 40 is securely latched to power drive 45, e.g. using latch 48 (FIG. 3). By way of further example and not limitation, a desired tool 40 is selected and power drive 45 pivoted, e.g. flipped backwards, so that first power drive interface 46 is facing a to-be-acquired tool 40. (FIG. 6) Tool changer 30 is refracted inward toward carousel 20 and the to-be-acquired tool 40 such that first power drive interface 46 makes a mechanical rotary connection to the to-be-acquired tool 40 which is then securely latched to power drive 45 (FIG. 6) Tool changer 30 is then extended outward to make room for the newly acquired tool 40 to be pivoted, e.g. flipped, to a forward/working position (FIG. 7) With tool 40 flipped forward, it is ready for use (FIG. 8) and tool changer 30 can be retracted or extended as necessary to facilitate using tool 40.

Figure 8:
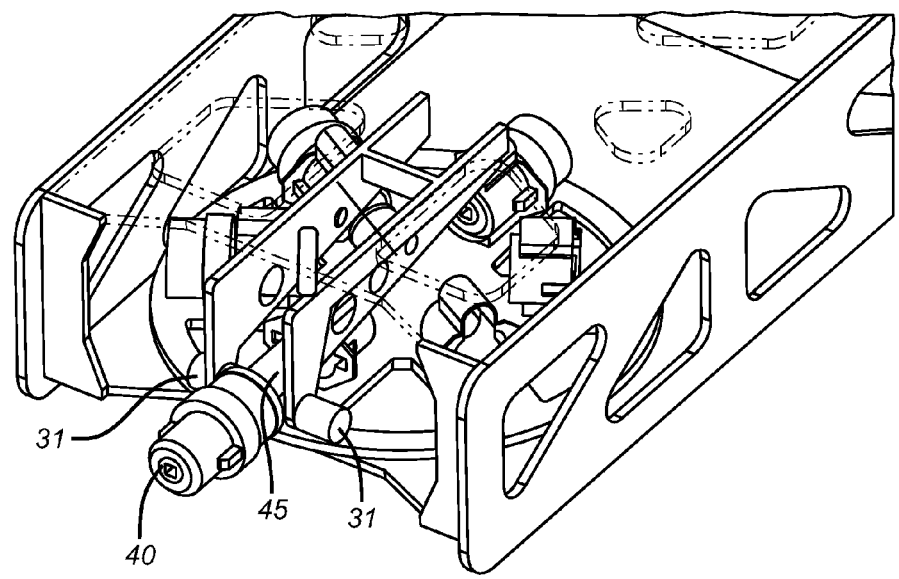

Once mated, tool changer 30 is then extended outward towards an outer boundary of housing 10 to make room for power drive 45 and tool 40 to be pivoted to a forward working position. (FIG. 7) When power drive 45 and tool 40 are pivoted forward, tool 40 is ready for use. In this working position, tool changer 30 can be retracted or extended as necessary to facilitate use of tool 40. (FIG. 8)

When another tool 40 is desired, the sequence can be reversed to stow a previously selected tool 40 back into a storage place, e.g. a tool retainer 22, and then select the next tool 40.

The foregoing disclosure and description of the inventions are illustrative and explanatory. Various changes in the size, shape, and materials, as well as in the details of the illustrative construction and/or a illustrative method may be made without departing from the spirit of the invention.

I claim:

1. A subsea tool changer, comprising:
   a. a housing adapted for use subsea, the housing comprising:
      i. a bottom comprising an outer boundary;
      ii. a plurality of side walls attached to the bottom at the outer boundary, the side walls and bottom defining an open interior of the housing; and
      iii. a substantially open side wall;
   b. a circular carousel rotatably mounted within the housing, the carousel comprising an upper surface exposed to the housing open interior;
   c. a plurality of tool retainers attached to the upper surface of the carousel, each of the tool retainers having a respective longitudinal axis that is disposed radially with respect to a center of the carousel, each tool retainer comprising:
      i. a first end disposed proximate the center of the carousel; and
      iii. a second end disposed radially opposite the tool retainer first end, each tool retainer second end adapted to removably receive a respective tool having a respective tool longitudinal axis into the respective tool retainer, with the respective tool longitudinal axis extending along the tool retainer's corresponding longitudinal axis;
   d. a power drive, comprising:
      i. a first power drive interface;
      ii. a power drive tool mating end adapted to selectively engage and disengage one of the tools, each of the tools comprising a respective commonly configured tool power interface, the power drive tool mating end further adapted to selectively couple the first power drive interface with and decouple the first power drive interface from the respective tool's commonly configured tool power interface; and
      iii. a power source interface operatively coupled to the first power drive interface, the power source interface adapted to operatively couple to a power source, receive at least one of electrical power or hydraulic power from the power source, and provide that power to the first power drive interface; and
   e. a tool changer movably disposed at least partially within the housing, the tool changer comprising a tool changer first end disposed within the housing and a tool changer second end disposed opposite the tool changer first end and proximate the housing open side wall, the power drive pivotably connected to the tool changer second end, the tool changer adapted to:
      i. selectively insert the power drive tool mating end into a respective one of the tools that is stowed in one of the plurality of tool retainers;
      ii. extract the power drive and the tool, into which tool the power drive tool mating end was inserted, from that tool retainer;
      iii. flip the extracted tool and power drive about an axis that is transverse with respect to the longitudinal axis of the extracted tool so as to flip the extracted tool and the longitudinal axis thereof from a first position to a second position such that the flipping of the extracted tool;
      iv. selectively flip the extracted tool and power drive from the second position back to the first position; and
      v. reseat the extracted tool back into one of the plurality of tool retainers.

2. The subsea tool changer of claim 1, wherein the tool changer second end further comprises an arm, and wherein the pivotable connecting of the power drive to the tool changer second end includes pivotably connecting the power drive is to the arm.

3. The subsea tool changer of claim 1, wherein the power drive further comprises a latch adapted to secure a selected removable tool to the power drive.

4. The subsea tool changer of claim 3, wherein the latch is selectively extendable and retractable.

5. The subsea tool changer of claim 1, wherein the power source includes a power supply disposed onboard the housing, the power supply operatively in communication with the power drive and adapted to provide the first power drive interface with at least one of electrical power or hydraulic power.

6. The subsea tool changer of claim 1, wherein the power source includes a power supply that is external to the subsea tool changer housing, the subsea tool changer further comprising an external power interface operatively in communication with the power drive, the external power interface adapted to interface with the power supply that is to the subsea tool changer.

7. The subsea tool changer of claim 6, wherein:
   a. the power supply external to the subsea tool changer comprises a remotely operated vehicle power source; and
   b. the external power interface is adapted to interface with the remotely operated vehicle power source to provide at least one of electrical power or hydraulic power to the power drive.

8. The subsea tool changer of claim 6, wherein:
   a. the power supply external to the subsea tool changer comprises an autonomously operated vehicle power source; and
   b. the external power interface is dimensioned and configured to interface with the autonomously operated vehicle power source to provide at least one of electrical power or hydraulic power to the power drive.

9. The subsea tool changer of claim 1, wherein:
   a. the housing further comprises a top disposed opposite the bottom and connected to the side walls, and wherein the bottom, side walls, and top define a substantially rectangular box; and
   b. the carousel, tool retainers, and tool changer first end are disposed within the substantially rectangular box.

10. The subsea tool changer of claim 1, wherein the housing comprises aluminum, glass-reinforced plastic (GRP), or a plastic.

11. The subsea tool changer of claim 1, wherein the carousel comprises aluminum, glass reinforced plastic (GRP), or a plastic.

12. The subsea tool changer of claim 1, further comprising a plurality of tools, each tool of the plurality of tools:
   a. adapted to selectively couple with and decouple from the power drive;
   b. adapted to be stowed into and extracted from a desired one of the plurality of tool retainers; and
   c. comprising a commonly configured second power drive interface adapted to operatively connect to the first power drive interface and receive at least one of electrical power or hydraulic power through the first power drive interface.

13. The subsea tool changer of claim 1, wherein the housing comprises polyethylene.

14. The subsea tool changer of claim 1, wherein the carousel comprises polyethylene.

* * * * *